(12) United States Patent
Mateer et al.

(10) Patent No.: US 8,322,895 B2
(45) Date of Patent: Dec. 4, 2012

(54) FLUORESCENT TUBE COLOR FILTER

(75) Inventors: Jeff Mateer, Fort Wayne, IN (US); Jason C. Kabot, Huntertown, IN (US)

(73) Assignee: Apollo Design Technology, Inc., Fort Wayne, IN (US)

( * ) Notice: Subject to any disclaimer, the term of this patent is extended or adjusted under 35 U.S.C. 154(b) by 109 days.

(21) Appl. No.: 12/271,697

(22) Filed: Nov. 14, 2008

(65) Prior Publication Data
US 2009/0129091 A1    May 21, 2009

Related U.S. Application Data

(60) Provisional application No. 60/987,810, filed on Nov. 14, 2007.

(51) Int. Cl.
*F21V 1/06* (2006.01)

(52) U.S. Cl. .............. 362/352; 362/320; 362/217.08; 362/217.02; 362/255; 362/223

(58) Field of Classification Search ............ 362/320, 362/352, 217.08, 255, 217.02, 224, 223
See application file for complete search history.

(56) References Cited

U.S. PATENT DOCUMENTS

| 2,820,918 | A | * | 1/1958 | Aronstein | 313/489 |
| 3,418,651 | A | * | 12/1968 | Jacobson | 340/321 |
| 4,642,086 | A | * | 2/1987 | Howarth, Jr. | 493/341 |
| 5,121,312 | A | * | 6/1992 | Hyland et al. | 362/352 |
| 5,571,280 | A | * | 11/1996 | Lehrer | 362/352 |
| 6,511,204 | B2 | | 1/2003 | Emmel et al. | |
| 2007/0091619 | A1 | * | 4/2007 | Lee | 362/354 |

OTHER PUBLICATIONS website: www.internetapollo.com/Products/PrintablProduct.aspx?id=1799; 1 page; Aug. 3, 2011.
website: www.internetapollo.com/Products/Pages/Gel.aspx; 2 pages; Aug. 3, 2011.
website: www.gamonline.com/catalog/gamtube/index.php; 6 pages; Aug. 3, 2011.

* cited by examiner

*Primary Examiner* — Robert May
(74) *Attorney, Agent, or Firm* — Barnes & Thornburg LLP; Alice O. Martin

(57) ABSTRACT

A filter for a fluorescent lighting tube. The filter includes a sheet of polymeric material having fold lines scribed thereon, defining a plurality of sections. The sections allow the filter to be positioned about and secured to a fluorescent tube without removal of the tube from its mounting fixture. The filter of the may be configured to filter color, ultraviolet light, or other wavelengths of the electromagnetic spectrum.

14 Claims, 2 Drawing Sheets

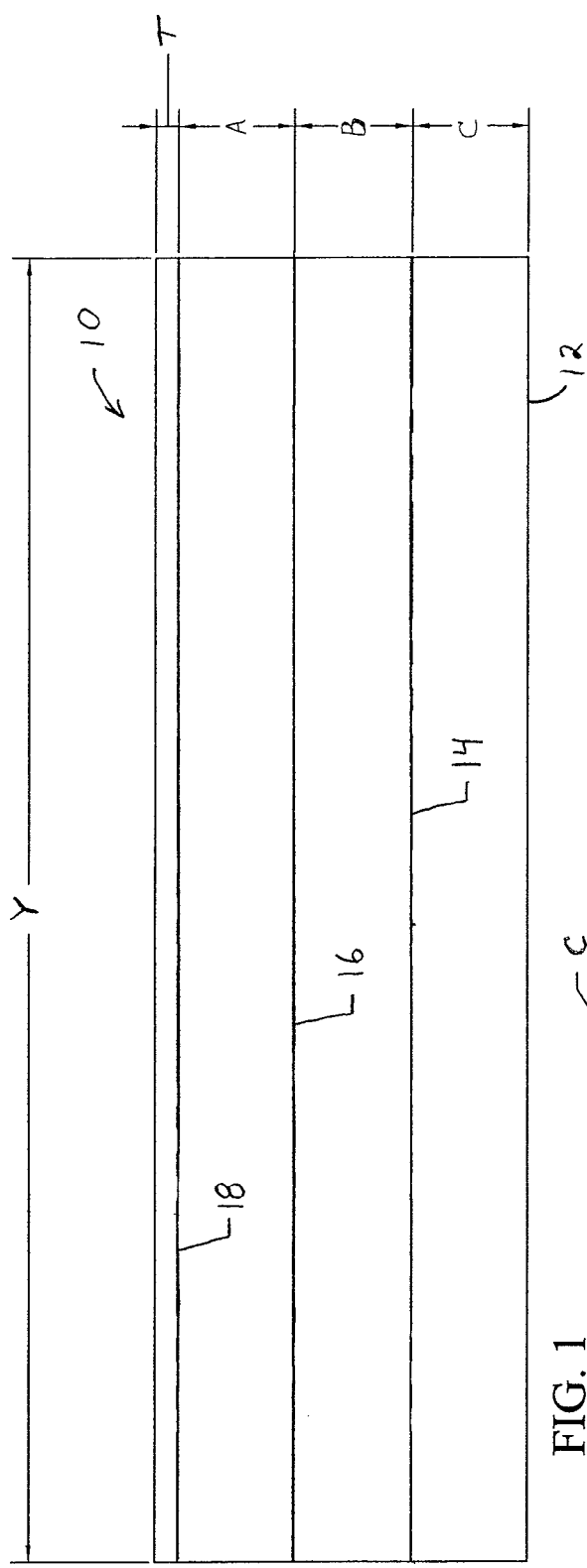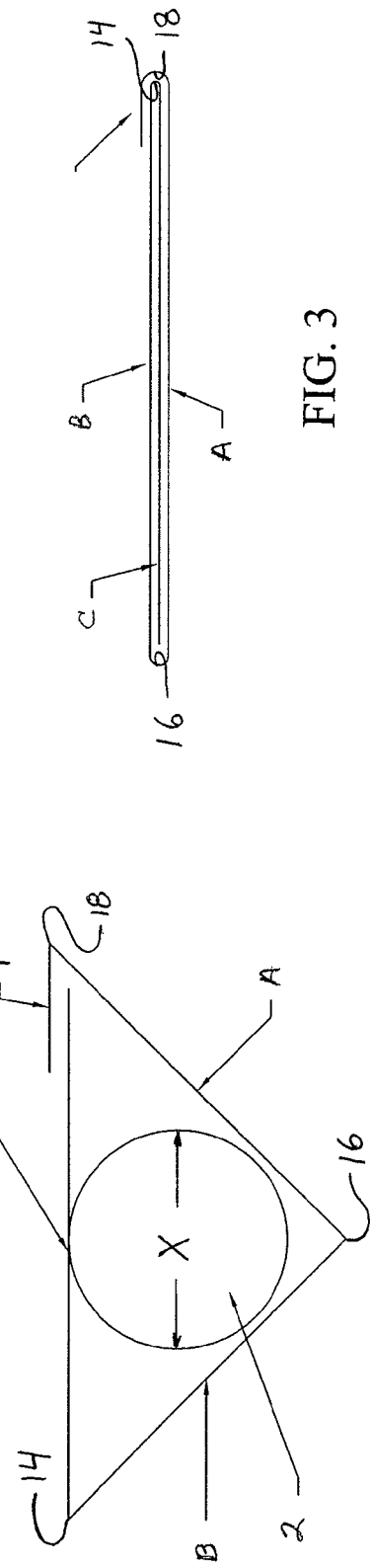

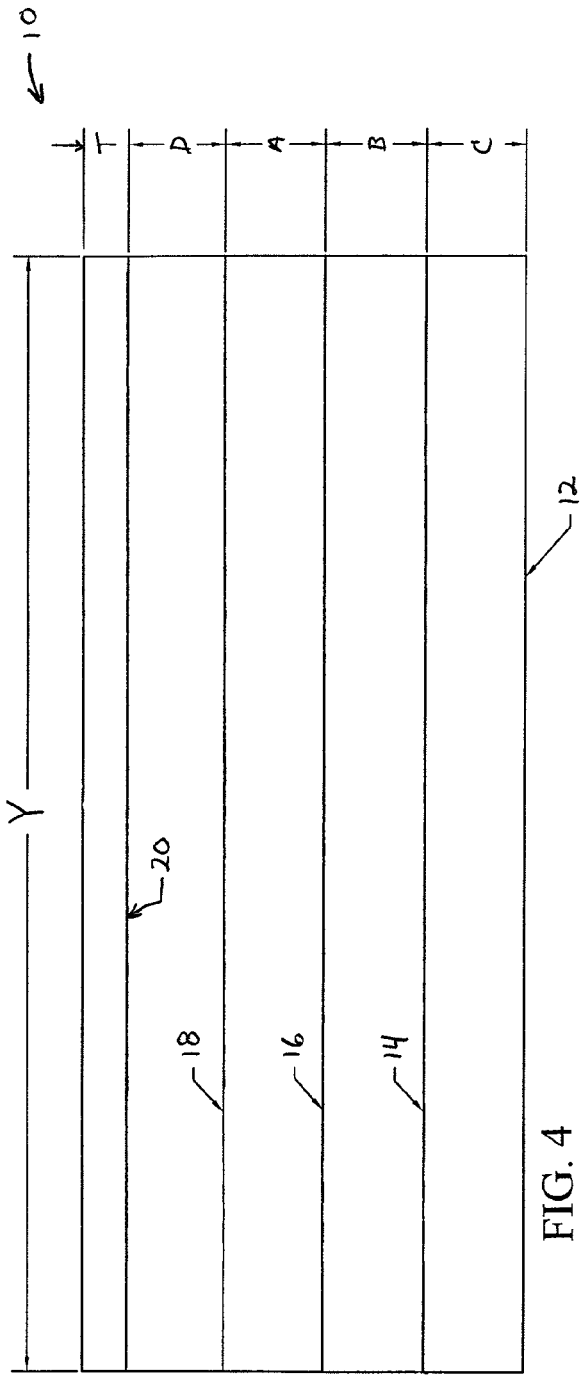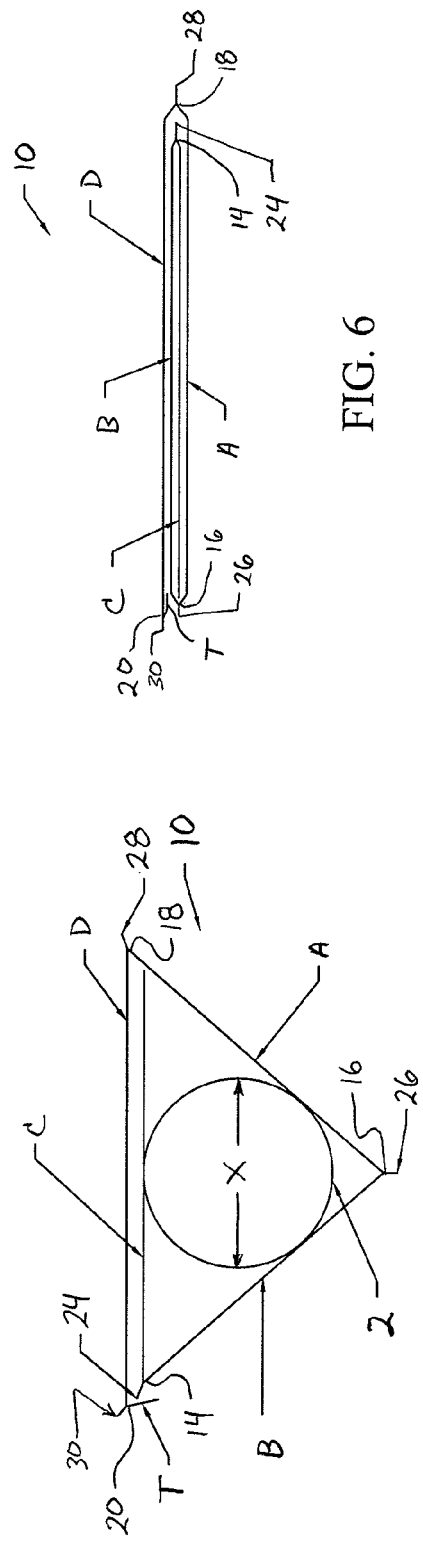
FIG. 4
FIG. 5
FIG. 6

FLUORESCENT TUBE COLOR FILTER

CROSS REFERENCE TO RELATED APPLICATIONS

This application claims the benefit of priority under 35 U.S.C. §119 to U.S. Provisional Patent Application Ser. No. 60/987,810 filed on Nov. 14, 2007.

BACKGROUND

The present disclosure is related generally to filters for fluorescent lighting tubes. In particular, a removable sleeve for filtering various wavelengths of the electromagnetic spectrum emitted by fluorescent lights.

Fluorescent tubes produce light that creates little heat, consumes minimal power and provides an even distribution of illumination. In several areas of the lighting industry, it is often desirable to alter the color of the light produced by a fluorescent tube. Typically, plastic filters of various color coatings are used to accomplish these alterations.

Additionally, specific coatings can be added to the filter that blocks ultraviolet light produced by the fluorescent tube. Ultraviolet light can damage objects in a similar manner that sunlight damages skin. Blocking ultraviolet light produced by the fluorescent tube is especially desirable when lighting museum collections and other valuable objects.

Many different colors of a plastic or polyester film are available to alter the color of any lighting fixture including a fluorescent tube. See Apollo Design Technology's web page http://www.internetapollo.com/products/productline.aspx?pl_id=8. This flat translucent or transparent polymeric film, known to those familiar with the art, is called gel. This name most likely refers back to the early days of theater when a gelatin material was used to manufacture color filters for stage lighting.

One of the challenges encountered is how to attach a flat gel material to fluorescent lights, which are usually long, slender tubes of glass. Several products have been designed to aid in the process of adding colored gel to fluorescent tubes. See the product named "Super Tube" at www.gamonline.com by Great America Lighting. See also http://www.internetapollo.com/products/productline.aspx?pl_id=33 by Apollo Design Technology, Inc.

The drawback of the aforementioned products is that the fluorescent tube must be removed from the fixture in order to place the colored sleeve over the tube. This becomes a labor intensive when more than a few fixtures must be colored.

Another approach to adding color to fluorescent tubes is disclosed in U.S. Pat. No. 6,511,204, which discloses an elongated polycarbonate configured to fit over a fluorescent tube and sleeve adapted to receive a colored film sheet for altering the light output characteristics of the fluorescent tube. One drawback with this product is that a semi rigid polycarbonate tube must be clipped over the fluorescent lamp. Subjecting a long tube of thin glass to this additional pressure could create a safety issue during installation. Additionally, even greater pressures are added when the colored sleeve is removed from the fluorescent tube. This could lead to the tube falling to the floor or even shattering overhead.

SUMMARY

The present disclosure is for a filter for a fluorescent lighting tube. The filter includes a sheet of polymeric material having fold lines scribed thereon, defining a number of sections. The sections allow the filter to be positioned about and secured to a fluorescent tube without removal of the tube from its mounting fixture. The filter of the present disclosure may filter color, ultraviolet light, or other wavelengths of the electromagnetic spectrum.

BRIEF DESCRIPTION OF THE DRAWINGS

FIG. 1 is a plan view of the filter of the present disclosure laid flat showing the position of the fold lines;

FIG. 2 is an expanded end view of the filter of the present disclosure mounted about a fluorescent tube; and FIG. 3 is a folded end view of the filter of the present disclosure in a compact folded configuration for storage.

FIG. 4 is a plan view of an alternative embodiment of the filter of the present disclosure laid flat showing the position of the fold lines;

FIG. 5 is an expanded end view of an alternative embodiment the filter of the present disclosure mounted about a fluorescent tube; and FIG. 6 is a folded end view of an alternative embodiment the filter of the present disclosure in a compact folded configuration for storage.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawings.

Referring to FIG. 1, the filter 10 of the present disclosure includes a flexible sheet of polymeric film 12, for example transparent polyester, configured for disposition about a fluorescent tube 2. Polymeric film 12, is sized to fit a fluorescent tube of X diameter and Y length. For example, common sizes of fluorescent tubes include diameters of 1½ inches, 1 inch, and ⅝ inch, and may have lengths ranging from 15 inches to 60 inches.

Filter 10 includes a number of sections. The exemplary embodiment is shown as having four sections, A, B, C, and T. The width of each section is determined based upon the diameter X of the intended fluorescent tube 2. Each section is sized such that filter 10 when expanded, as shown in FIG. 2, filter 10 may be disposed about and envelop fluorescent tube 2.

For example, in the exemplary embodiment of the filter 10 having four sections, the filter 10 is configured such that when expanded and disposed about a fluorescent tube 2 the four sections allow the polymeric film to take on a triangular cross-section around the fluorescent tube. The length of a side of an equilateral triangle is related to the diameter of a circle inscribed therein by the formula:

$$C = \frac{3X}{\sqrt{3}},$$

wherein C is the length of the triangle side and X is the diameter of the inscribed circle. Thus, the width of section C should be greater than 1.73X. To allow folding of the filter, as shown in FIG. 3, the width of section B is approximately 0.05 inch larger than the width of section C and the width of section A is approximately 0.10 inch larger than the width of section C. Section T forms a locking tab or flap when filter 12 is in the expanded state, and it has been found that a acceptable width of section T is approximately one-third the width of section A. Of course, one skilled in the art should be able to determine dimensions for other geometric configurations Each section is separated by fold line 14, 16, 18. Each fold line may be a region of reduced film thickness, for example a scribe line. In the exemplary embodiment, after the polymeric film 12 is cut to size, fold lines 14, 16, and 18 are laser scribed into the polymeric film. Polymeric film 12, of the type employed in the filter of the present disclosure may have a thickness on the order of 0.003 inch. Fold lines 14, 16, 18 may be scribed by removing approximately 0.0015 inch of material from polymeric film 12 at the desired locations, or approximately half the film thickness. As should be apparent to one of skill in the art, any scribing method is appropriate and the present disclosure should not be construed as being limited to laser scribing the fold lines. However, laser scribing does result in the benefit of producing a line that is invisible on the face of the film 12.

Scribing film 12, only slightly changes the natural memory of the film material. When the filter 10 is configured in an expanded arrangement, as shown in FIG. 2, the retained memory of the material causes the filter 10 to wrap around the fluorescent tube, instead of returning to the film's natural flat state. Filter 10, when in the expanded state, has polymeric film 12 oriented such that fold lines are located on the outside corners of filter 10. Having the fold lines 14, 16, 18 located on the outside of the filter causes the polymeric film 12 to retain the expanded configuration.

An alternative embodiment as shown in FIGS. 4-6, filter 10 further includes an additional section D, to additionally secure filter 10 about fluorescent tube 2. In this embodiment, polymeric film 12 includes an additional section D positioned between section A and tab T as shown in FIG. 4. Fold line 20 separates section D from tab T.

Thermal or ultrasonic welds 24, 26, 28, 30 may also be located on the fold lines 14, 16, 18, 20 (respectively) as shown in FIG. 5. These welds add memory to the folds and cause greater retention of the expanded configuration. In the exemplary embodiment, ultrasonic welds are located along the entire length of fold lines 14, 16, 18 and 20 on the same side of polymeric film 12 as is scored. First, the film 12 is laser scored to form fold lines 14, 16, 18 and 20 and the filter 10 is arranged in the expanded configuration of FIG. 5. Then welds 24, 26, 28, 30 are made over the fold lines 14, 16, 18 and 20. Finally, filter is folded as shown in FIG. 6 for shipment or storage. The welds 24, 26, 28, 30 not only aid in retention of the filter 10 in the expanded configuration, but also assist in retention of the filter 10 in the folded configuration as shown in FIG. 6.

Sections A, B, C and D can vary in width. This feature allows the filter 10 to be collapsed into the shape illustrated in the folded end views of FIGS. 3 and 6. This compacted shape allows for efficient shipping and also protects the gel during transit.

The filter 10 of the present disclosure is configured to form a triangular cross section, however, the filter may have more or fewer sides and still be within the scope of this disclosure. Referring to FIGS. 1-3, to install filter 10 about a fluorescent tube, the triangle is opened slightly. Section C is slipped over the top of the fluorescent tube 2. Tab T is lifted and as sections B and A are positioned about fluorescent tube 2, tab T overlaps a portion of section C. The locking tab, T, is pulled over section C. This action forms a triangle of colored gel that is locked in place around the entire fluorescent tube 2. The filter shown in FIGS. 3-6 is installed in a similar manner except that section D completely overlaps section C with tab T engaging a portion of section B. This configuration provides additional support for the filter 10 about fluorescent tube 2 and provides greater assurance that filter 10 will not fall off fluorescent tube 2.

The invention claimed is:

1. A filter for controlling the wavelength of electromagnetic radiation emitted from a fluorescent tube with opposing ends of the tube mounted in a fixture, the filter having an expanded configuration for disposition about a fluorescent tube and a folded configuration for storage, the color filter comprising
    a sheet of flexible polymeric material,
    the sheet of polymeric material having a plurality of parallel sections, each section separated from an adjacent section by a fold line, wherein the polymeric material at the fold line has a thickness that is approximately half the thickness of the remainder of the sheet,
    each fold line comprising a region of reduced material thickness, and
    wherein the filter oriented in the expanded configuration defines an opening which allows for disposition of the filter about the fluorescent tube without removal of the fluorescent tube from the fixture,
    wherein, in the expanded configuration, the filter has a polygonal cross-sectional shape.

2. The filter of claim 1 wherein the polymeric material comprises a transparent polyester.

3. The filter of claim 1 wherein the fold lines are laser scribed into the polymeric material.

4. The filter of claim 1 wherein the fold lines are formed such that they are invisible to a naked human eye.

5. The filter of claim 1 wherein the filter is configured to allow emission of electromagnetic radiation in wavelengths of the visible spectrum.

6. The filter of claim 1 wherein the filter is configured to inhibit emission of electromagnetic radiation in wavelengths of the ultra-violet spectrum.

7. The filter of claim 1 further including a weld disposed over each fold line.

8. The filter of claim 1, wherein one of the parallel sections forms a tab configured to close the opening when the filter is disposed about the fluorescent tube.

9. A filter for controlling the wavelength of electromagnetic radiation emitted from a fluorescent tube with opposing ends of the tube mounted in a fixture, the filter having an expanded configuration for disposition about a fluorescent tube and a folded configuration for storage, the color filter comprising
    a sheet of flexible polymeric material,
    the sheet of polymeric material having a plurality of parallel sections, each section separated from an adjacent section by a fold line, each fold line being invisible to a naked human eye,
    the fold line comprising a region of reduced material thickness, wherein the thickness of the polymeric material at the fold line is about half the thickness of the surrounding material,
    weld lines disposed over each fold line, wherein the weld lines add memory to the fold lines, and
    wherein the filter oriented in the expanded configuration defines an opening which allows for disposition of the filter about the fluorescent tube without removal of the fluorescent tube from the fixture, and the memory provided by the welds allows the filter to close around the tube to retain the filter on the tube.

10. The filter of claim 9 wherein the filter is configured to allow emission of electromagnetic radiation in wavelengths of the visible spectrum.

11. The filter of claim 9 wherein the filter is configured to inhibit emission of electromagnetic radiation in wavelengths of the ultra-violet spectrum.

12. The filter of claim 9, wherein the polymeric material comprises a transparent polyester.

13. The filter of claim 9, wherein one of the parallel sections forms a tab configured to close the opening when the filter is disposed about the fluorescent tube.

14. A filter for controlling the wavelength of electromagnetic radiation emitted from a fluorescent tube with opposing ends of the tube mounted in a fixture, the filter having an expanded configuration for disposition about a fluorescent tube and a folded configuration for storage, the color filter comprising a sheet of flexible polymeric material,
the sheet of polymeric material having a plurality of parallel sections, each section separated from an adjacent section by a fold line, each fold line comprising a region of reduced material thickness, and
weld lines disposed over each fold line, wherein the weld lines add memory to the fold lines,
wherein the fold lines are disposed on an outward facing side of the polymeric film when in the expanded configuration,
wherein the fold lines are disposed on an inward facing side of the polymeric film when in the folded configuration, and
wherein the filter oriented in the expanded configuration defines an opening which allows for disposition of the filter about the fluorescent tube without removal of the fluorescent tube from the fixture, and the memory provided by the welds allows the filter to close around the tube to retain the filter on the tube.

* * * * *